(12) United States Patent
Cheung

(10) Patent No.: US 6,581,876 B2
(45) Date of Patent: Jun. 24, 2003

(54) AIRCRAFT MULTI-FUNCTION OVERHEAD SPACE ACCESS MODULE

(75) Inventor: Kwun-Wing W. Cheung, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/912,877

(22) Filed: Jul. 25, 2001

(65) Prior Publication Data

US 2003/0019976 A1 Jan. 30, 2003

(51) Int. Cl.⁷ .............................................. B64D 11/00
(52) U.S. Cl. ................................................ 244/118.5
(58) Field of Search ...................... 244/118.5, 129.6, 244/117 R, 118.1, 129.4; 182/77, 79, 163, 39, 36, 80.1–80.3, 108, 109; 211/17, 22

(56) References Cited

U.S. PATENT DOCUMENTS

| | | | | |
|---|---|---|---|---|
| 423,962 A | * | 3/1890 | Smith | 182/13 |
| 508,099 A | * | 11/1893 | Fisher | 182/39 |
| 528,824 A | * | 11/1894 | Sumner | 182/39 |
| 907,401 A | * | 12/1908 | Prouty | 182/163 |
| 1,090,803 A | * | 3/1914 | Brown | 182/39 |
| 2,863,593 A | * | 12/1958 | Neiman | 182/77 |
| 2,945,548 A | * | 7/1960 | Tapp | 182/77 |
| 3,735,838 A | * | 5/1973 | Greenleaf | 16/35 R |
| 4,742,888 A | * | 5/1988 | Amacker | 182/116 |
| 4,815,561 A | * | 3/1989 | Ostrander | 182/163 |
| 5,150,863 A | * | 9/1992 | Hozumi | 244/118.5 |
| 5,174,411 A | * | 12/1992 | Oliver et al. | 182/77 |
| 5,395,075 A | * | 3/1995 | Sprenger et al. | 182/77 |
| 5,562,215 A | * | 10/1996 | Blakey et al. | 211/17 |
| 5,626,241 A | * | 5/1997 | Holden | 108/55.3 |
| 5,628,151 A | * | 5/1997 | Monat | 182/46 |
| 5,738,227 A | * | 4/1998 | Duff et al. | 211/151 |
| 6,003,813 A | * | 12/1999 | Wentland et al. | 244/118.5 |
| 6,007,025 A | * | 12/1999 | Coughren et al. | 105/329.1 |
| 6,014,841 A | * | 1/2000 | McCoy et al. | 182/46 |
| 6,182,926 B1 | * | 2/2001 | Moore | 244/118.5 |
| 6,257,523 B1 | * | 7/2001 | Olliges | 160/210 |
| 6,305,645 B1 | * | 10/2001 | Moore | 244/118.5 |

* cited by examiner

Primary Examiner—Charles T. Jordan
Assistant Examiner—Stephen A Holzen
(74) Attorney, Agent, or Firm—Harness Dickey & Pierce P.L.C.

(57) ABSTRACT

An access module for an aircraft for enabling access to an overhead area of said aircraft, as well as providing a changing room for a crewmember. The access module has dimensions comparable to a standard lavatory module and includes a ladder that may be moved from a stowed position, in which it takes up substantially no interior area of the module, to an extended position, which allows a crewmember to easily gain access to the overhead area.

17 Claims, 6 Drawing Sheets

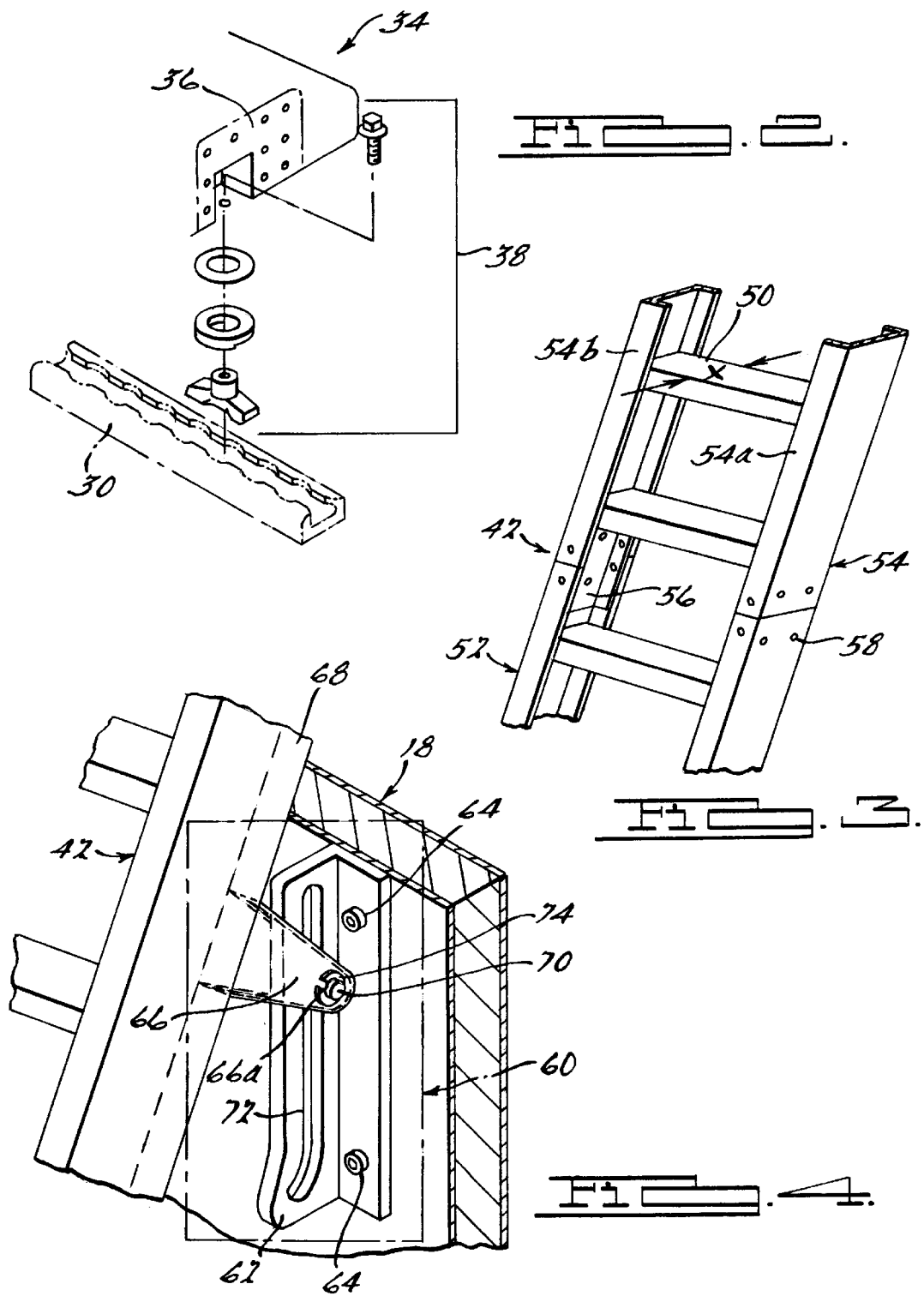

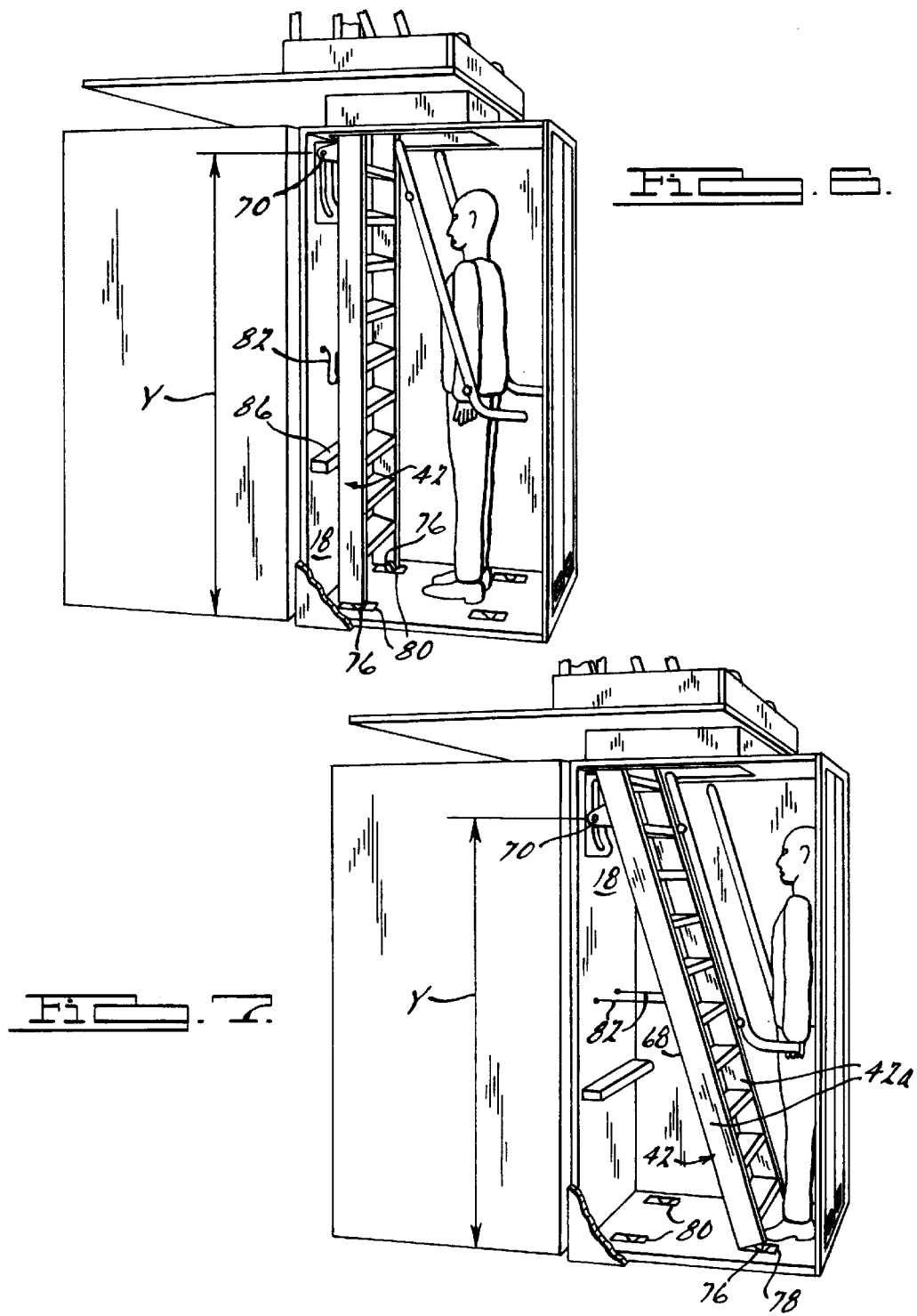

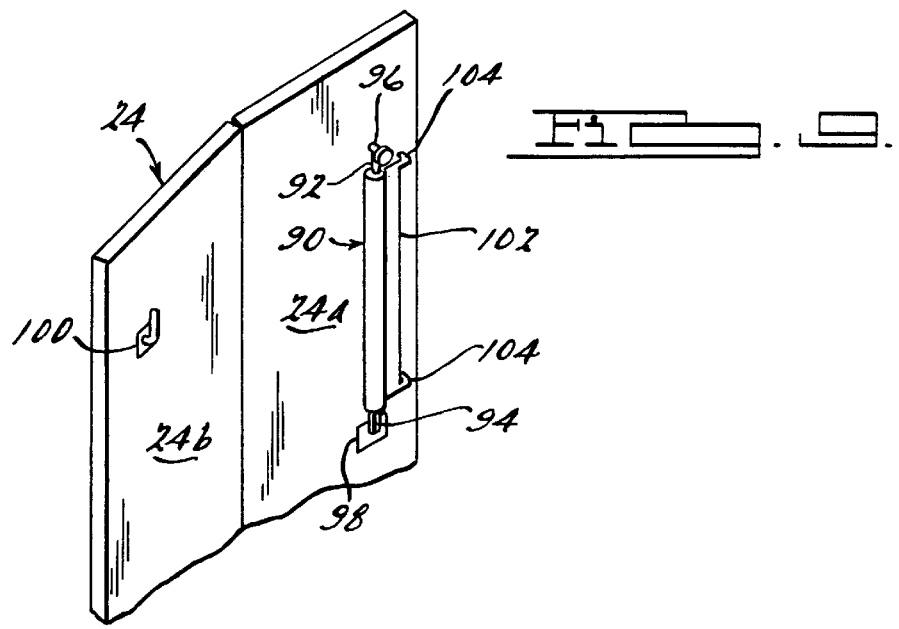
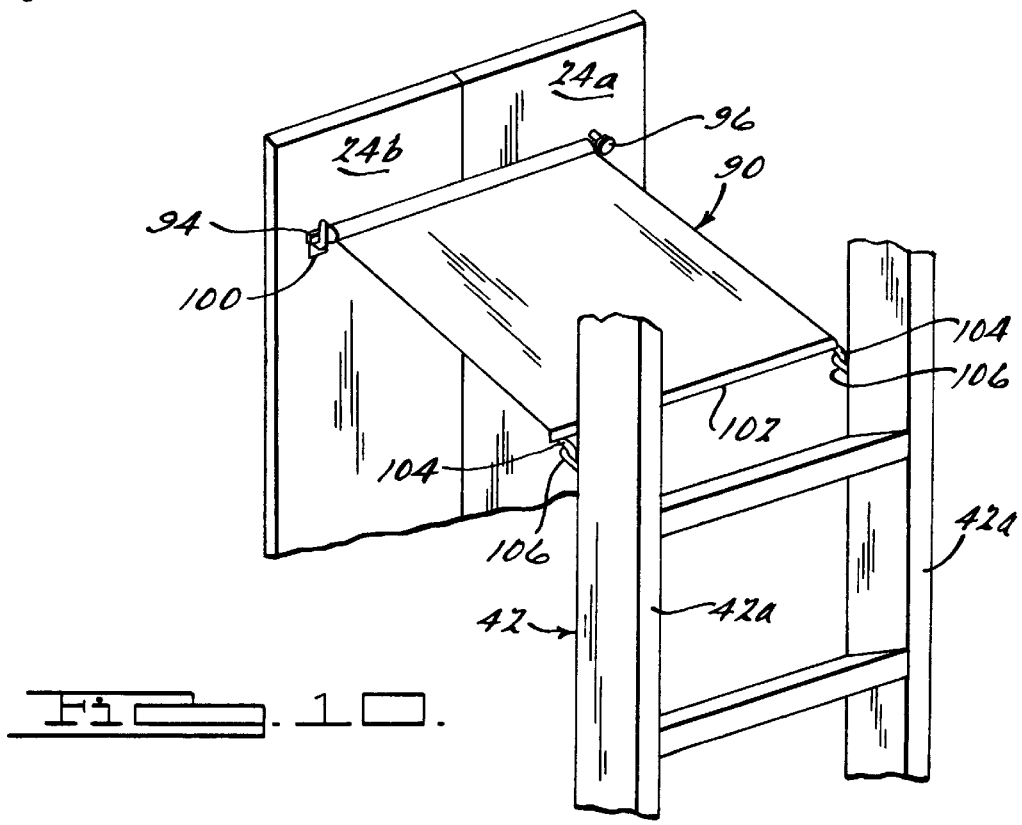

AIRCRAFT MULTI-FUNCTION OVERHEAD SPACE ACCESS MODULE

FIELD OF THE INVENTION

The present invention relates in general to airplanes and more particularly to an apparatus that enables a person to gain access to the overhead area of a commercial passenger aircraft while also functioning as a full sized changing room, and which has a footprint no larger than a standard lavatory module.

BACKGROUND OF THE INVENTION

Occasionally during a commercial passenger airline flight a member of the flight crew may find it necessary or desirable to change his or her clothes. Since commercial airlines typically do not have dedicated changing rooms, the lavatory often becomes the most used facility for changing purposes. However, due to its very small space, the lavatory generally provides a less than suitable changing area. A preferable alternative would be to provide the crew with a dedicated changing room. Unfortunately, doing so would generally require eliminating revenue producing passenger seats or valuable storage space to make room for the dedicated changing room. Instead, it would be desirable and beneficial to provide a dedicated changing room that does not require eliminating passenger seats or reducing the amount of storage space available on the aircraft.

SUMMARY OF THE INVENTION

In accordance with the present invention, a preferred embodiment of a multi-function overhead space access module is disclosed. The access module is generally box shaped and preferably has the same outside dimensions and appearance as a lavatory. To avoid having to eliminate passenger seats to make room for the access module, the access module is preferably substituted in place of one of the aircraft's existing lavatories.

When installed in an aircraft that has usable overhead space, the module is capable of functioning as both a changing room and as a means for accessing the overhead area. The overhead area is accessible by means of a movable ladder installed within the access module. The ladder can be positioned in either a predetermined extended (i.e., operative) or a stowed position. Placing the ladder in its extended position enables a user to conveniently access the overhead area of the aircraft. Moving the ladder to its stowed position allows the interior area of the module to be used as a changing room.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is an enlarged view of the mechanism for attaching the bottom of the access module to a seat track mounted on a floor of the aircraft;

FIG. 3 is an enlarged view showing the ladder's center joint;

FIG. 4 is an enlarged view showing the track mount mechanism;

FIG. 6 is a perspective view of the access module showing the ladder in its stowed position;

FIG. 7 is a perspective view of the access module showing the ladder in its extended position;

FIG. 8 is a perspective view of the access module illustrating how a person located in the overhead area moves the ladder from its stowed position to its extended position;

FIG. 9 is a view of the back of the bi-fold door showing the roller shade in its stowed position; and FIG. 10 is a perspective view of the inside of the access module showing the roller shade in its deployed position.

DETAILED DESCRIPTION OF THE PREFERRED EMBODIMENTS

The following description of the preferred embodiment(s) is merely exemplary in nature and is in no way intended to limit the invention, its application, or uses.

Figure 1:
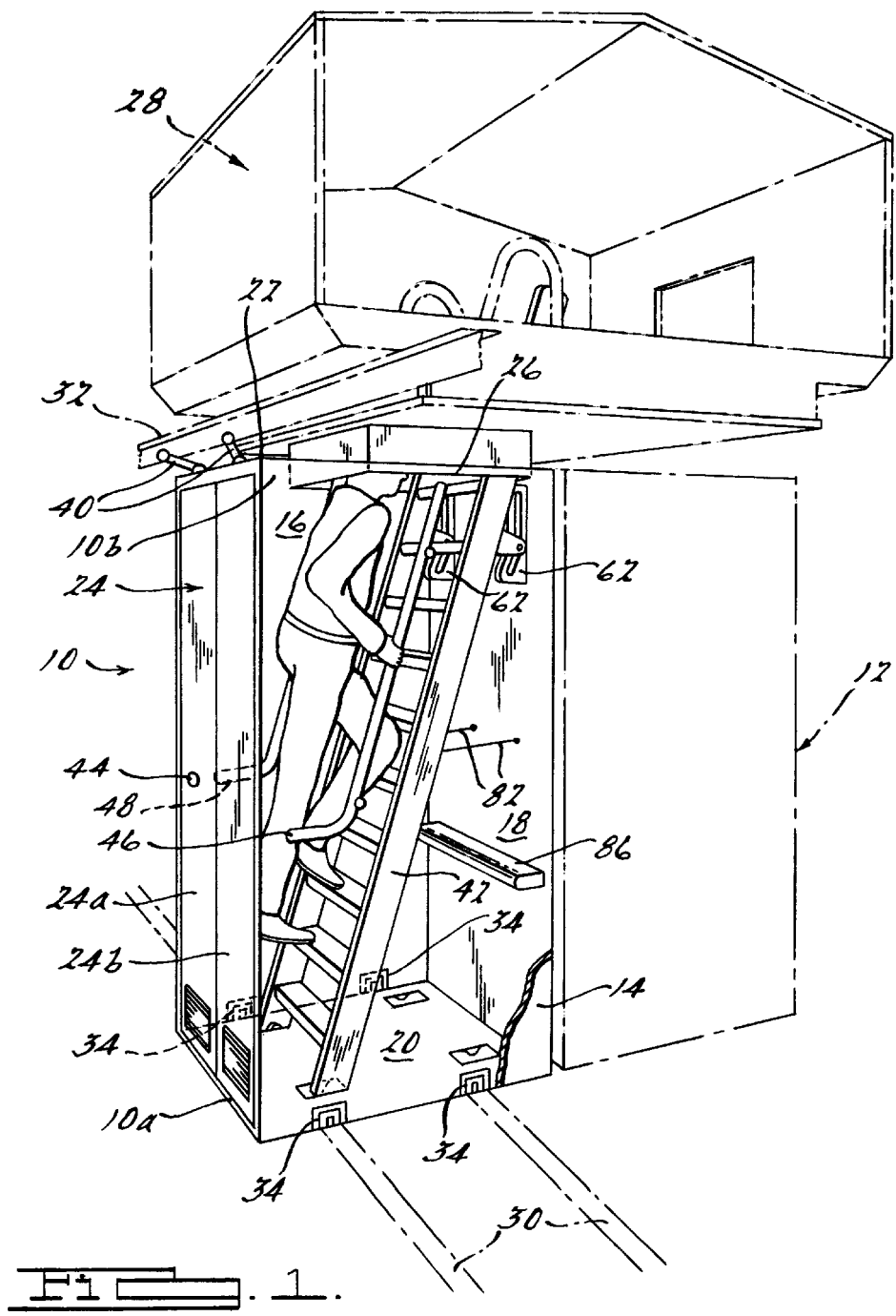
FIG. 1 is a perspective view of a multi-function access module of the present invention with a wall portion in the foreground broken away to illustrate the interior of the module.

Referring to FIG. 1, there is shown an access module 10 in accordance with a preferred embodiment of the present invention. The access module 10 has the same exterior dimensions, footprint, and appearance as an aircraft lavatory module and is preferably substituted in place of an existing lavatory module on an aircraft. For example, a deck plan for a Boeing 777® commercial aircraft proposes two adjacent lavatories located at the center of the passenger deck between the second and third exterior doors. The access module 10 of the present invention is substituted in place of one of the two center lavatories of such an aircraft deck design. This results in the configuration shown in FIG. 1, wherein the access module 10 is positioned within the aircraft immediately adjacent to the remaining center lavatory 12.

Continuing to refer to FIG. 1, the access module 10 has a right side wall panel 14, a left side wall panel 16, a back wall panel 18, a floor panel 20, a ceiling panel 22, and a bi-fold door 24. The ceiling panel 22 has an access opening 26 that is sufficiently large to allow a person to comfortably gain access to an overhead area 28.

Since the access module 10 has approximately the same exterior dimensions and appearance as an existing lavatory, the access module may be constructed using the same materials and methods used to construct a lavatory module, which are both well known to the skilled artisan. For example, panels 14, 16, 18, 20, and 22 may be constructed by layering one or more plies of fiberglass skin over each side of a Nomex® honeycomb core. The shell of the access module 10 is formed by suitably attaching panels 14, 16, 18, 20, and 22 to one another to form a generally box shaped structure. The bi-fold door 24, which is of a conventional design similar or identical to that used on a lavatory module, is attached to the front of the access module 10 in a conventional manner.

Continuing to refer to FIG. 1, the access module 10 is preferably attached to a pair of seat tracks 30 and an overhead bin rail 32 in a manner similar or identical to that used to attach lavatory module 12. A base 10*a* of the access module 10 is preferably attached to the seat tracks 30 at four locations 34 using conventional brackets 36 and a known seat track insert assembly 38, both of which are shown in greater detail in FIG. 2. Brackets 36 are suitably attached to the lower edge of the right and left wall panels 14 and 16. The front top 10*b* of the access module 10 is suitably attached to the overhead bin rail 32 using two tie rods 40.

Continuing to refer to FIG. 1, the bi-fold door 24 will preferably be as tall as the access module envelope will allow in order to minimize the possibility of a person striking his/her head while entering the access module 10 and stepping onto a ladder assembly 42 that is oriented in its extended position within the module. The bi-fold door 24 will preferably have a conventional latch 44 that can only be unlatched from the outside using a key, but may be opened or locked by the user from the inside without using a key.

With further reference to FIG. 1, the access module 10 includes the track-mounted ladder assembly 42, which is geometrically configured to provide the best possible ergonomics for the user within the interior area of the module. The ladder assembly 42 is preferably made of aluminum, however, it shall be appreciated that other materials may also be used provided they are relatively light in weight and structurally strong. Tubular shaped handrails 46 and 48 are fixedly mounted to the inside surface of right wall panel 14 and left wall panel 16, respectively.

The overall length of the ladder assembly 42, in one preferred form, is 114 inches (approximately 290 cm). The overall width of the ladder assembly 42, in one preferred form, is 24 inches (approximately 61 cm). However, it will be appreciated that these dimensions could vary significantly depending on the specific dimensions of the module 10 and the elevation of the overhead area 28.

Referring now to FIG. 3, each step 50 has a landing width "X", which is wide enough to allow a person to easily step thereon. In one preferred form, the steps 50 have a width of approximately 5 inches (approximately 13 cm). Ladder assembly 42 is preferably divided into two separate halves 52 and 54 for shipping and installation convenience. The two halves 52 and 54 can be rigidly connected together using brackets 56 and bolts 58, or any other suitable fastening components, as part of the installation procedure.

Referring now to FIG. 4, the ladder assembly 42 is movably attached to the back wall 18 of the access module 10 by means of a track mounting mechanism 60. Mechanism 60 consists of a pair of slotted track mounts 62 (only one being visible) that are fixedly mounted to back wall 18 using bolts 64, or some other suitable means for structural attachment. A pair of generally U-shaped brackets 66, which are designed to mate with slotted track mounts 62, are rigidly attached (i.e., by bolting, welding, etc.) to a back side surface 68 of the left and right rails 54*a* and 54*b* of the upper half 54 of ladder assembly 42 in the manner shown in FIG. 4. Each of the brackets 66 are movably connected to the slotted track mounts 62 by means of a round dowel pin 70. The dowel pins 70 are inserted through holes 66*a* in the distal ends of brackets 66 and a slot 72 of the slotted track mounts 62. Dowel pin 70 is preferably made of stainless steel.

To provide quiet and smooth movement of the ladder assembly 42, as well as to prevent vibration induced chattering between each dowel pin 70 and its respective slot 72, the width of slot 72 of track mount 62 will preferably be slightly larger (preferably about 0.010 to 0.015 inches (0.0254 to 0.0381 mm) wider) than the diameter of dowel pin 70. The dowel pins 70 are secured to the brackets 66 by means of conventional snap rings 74 that are inserted into a circumferential groove that is manufactured into each end of the dowel pins 70. For smoother operation, the dowel pins 70 may incorporate bearings (not shown).

Continuing to refer to FIG. 4, the slot 72 of track mount 62 has a shape that is determined by a desired curve that dowel pin 70 traces as the ladder assembly 42 is moved from its stowed position, as shown in FIG. 6, to its extended position, as shown in FIG. 7, and vise versa. The curvature of slot 72 is determined by combining the separately determined vertical and horizontal positions of dowel pins 70 as the ladder assembly 42 is moved from one position to another. For example, moving the ladder assembly 42 from its stowed position (FIG. 6) to its extended position (FIG. 7) will cause the upper end of the ladder assembly to pivot about dowel pins 70 (see FIG. 4), which could cause the upper end of the ladder assembly to contact and damage the edge of the access opening 26 (FIG. 1). To prevent this contact from occurring, dowels pins 70 will need to move progressively further away from the rear wall panel 18, along a generally horizontal plane, as the ladder assembly 42 is moved from its stowed position to its extended position. Similarly, in order for the bottom of the ladder assembly to remain in contact with the floor panel 20 as the ladder assembly is extended, the distance from the dowel pins 70 to the floor panel 20 (dimension "Y" in FIGS. 6 and 7) will have to decrease. Consequently, dowel pins 70 should also be free to move in a generally vertical plane. By combining the desired horizontal and vertical motion of dowel pins 70 as the ladder assembly 42 is moved from one position to another, it is possible to determine a contour of slot 72 that will provide smooth and unfettered motion of ladder assembly 42. It is this desired arc shaped path that defines the shape of slot 72 of track mount 62.

Figure 5:
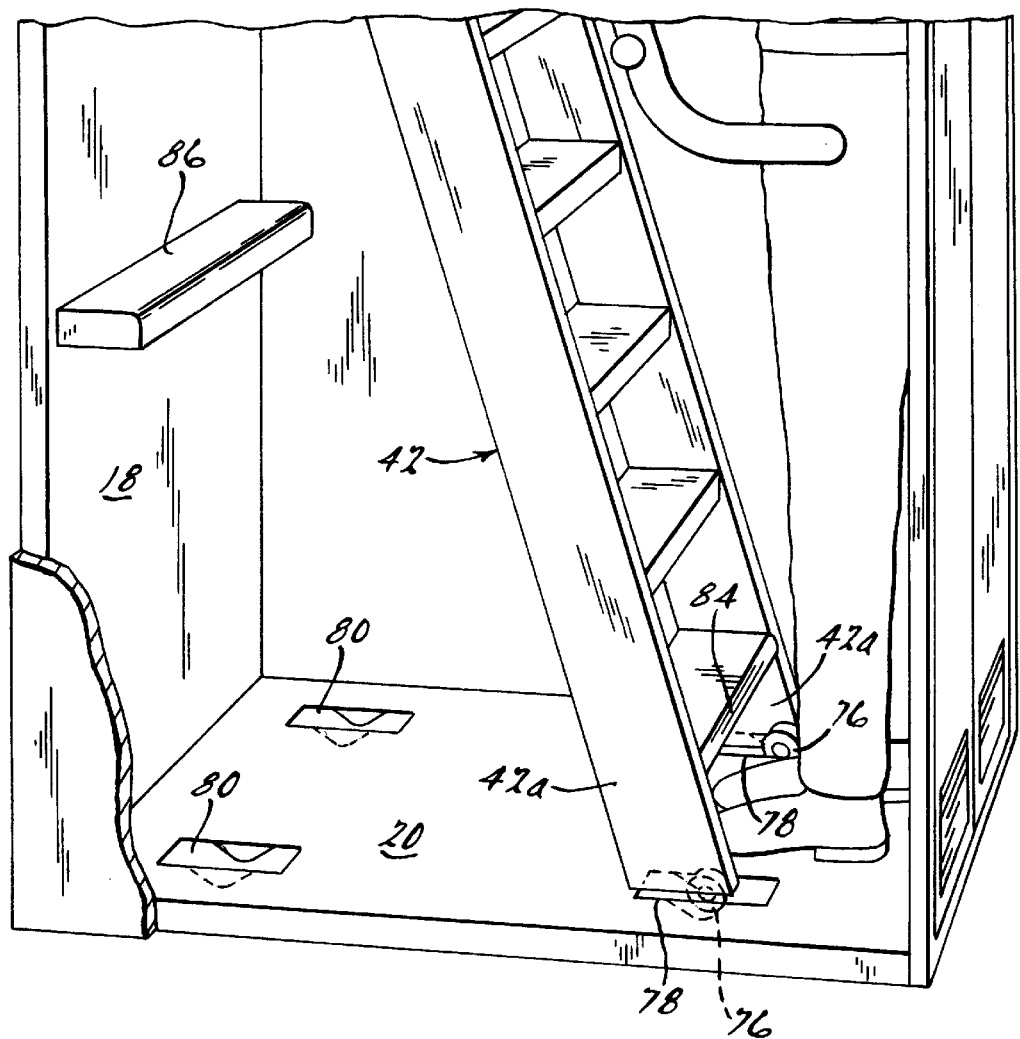
FIG. 5 is an enlarged view showing the floor mounted retaining pockets used to capture and retain the wheels mounted to the bottom of the ladder.
Figure 5:
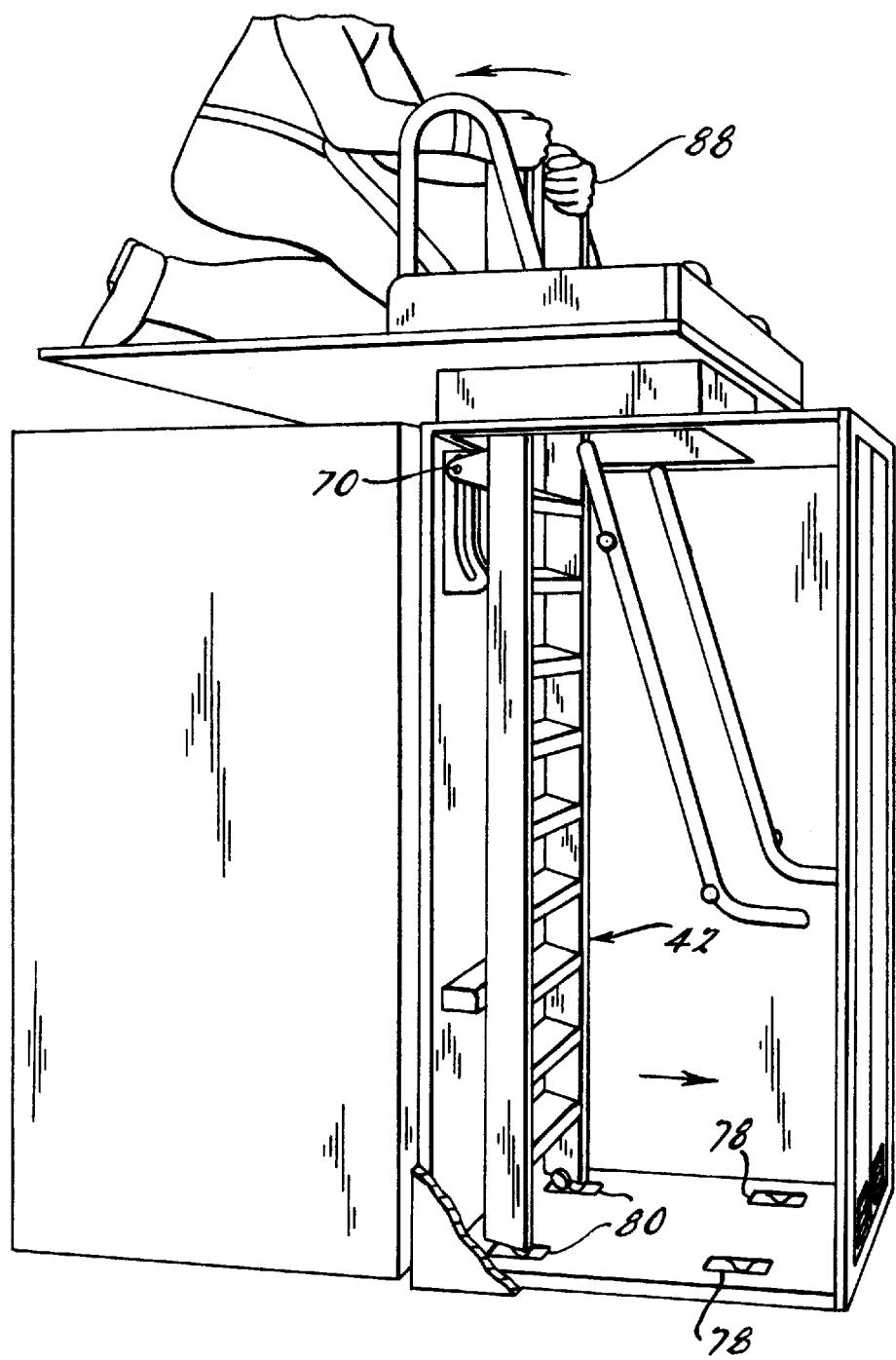

Referring now to FIGS. 6 and 7, the ladder assembly 42 is intended to function in either one of two positions. The ladder assembly 42 may be positioned in either its stowed position, as shown in FIG. 6, or its extended (i.e., operative) position, as shown in FIG. 7. A conventional roller 76 (better shown in FIG. 5) is attached to the bottom of each leg 42*a* of the ladder assembly 42 to facilitate extending and stowing of the ladder assembly. The ladder assembly 42 is generally positioned in its extended position (see FIG. 7) to allow access to the overhead area 28 (FIG. 1). A forward set of retaining pockets 78, and a rearward set of retaining pockets 80, which are each preferably made of metal, are suitably attached to the floor panel 20 (FIGS. 5 and 7). The forward retaining pockets 78 form depressions in the floor panel 20 for capturing and retaining rollers 76, thereby providing a means for positively indexing the ladder assembly 42 when it is situated in its extended position.

Two cables 82 provide support for the ladder assembly 42 and prevent the ladder assembly from being overextended. The cables 82 each have one end suitably attached to back wall panel 18 and the other end thereof securely attached to the back surfaces 68 of each leg 42*a* of ladder assembly 42, as shown in FIG. 7.

Referring to FIG. 5, a resilient and impact absorbing strip of material 84, which may consist of rubber or some other functionally equivalent material, is suitably attached to the leading edge of the bottom step of ladder assembly 42. This is intended to provide cushioning in the unlikely event that the ladder assembly 42 is mishandled while being extended.

Referring to FIG. 6, the ladder assembly 42 can be stowed by simply pushing the ladder assembly towards the rear wall panel 18 until the ladder assembly contacts a bumper 86 mounted on the back wall 18. Bumper 86 can be made of rubber or any other soft and resilient material. The retaining pockets 80 form depressions in the floor panel 20 for capturing and retaining rollers 76. The retaining pockets 80 are positioned such that the rollers 76 will drop down into the depression at the same time the ladder assembly 42 contacts the bumper 86, thereby securing the ladder assembly in its stowed position.

Referring now to FIG. 8, there is shown a situation in which the ladder assembly 42 has been moved to its stowed position while a person is occupying the overhead area 28 (see FIG. 1). If the person in the overhead area 28 wants to step down, the ladder assembly 42 can be moved to its extended position by simply pulling the top portion 88 of the ladder assembly toward the occupant. This will cause the ladder assembly 42 to pivot about dowel pins 70, which in turn will move the ladder assembly 42 to its extended position as shown in FIG. 7. Alternatively, the occupant may also elect to climb down the ladder assembly 42 while the ladder assembly is in its stowed position. While in its stowed position the ladder assembly 42 functions in much the same manner as a conventional utility ladder.

Referring to FIGS. 9 and 10, there is shown a conventional roller shade 90 that can be used to visually block the access opening 26 (FIG. 1) of the overhead area 28 in order to provide personal privacy when the access module 10 is being used as a changing room. In a preferred embodiment of the present invention, one end 92 of the roller shade 90 is formed in such a manner as to create a circular loop that is geometrically similar to an eyebolt. The other end 94 of the roller shade consists of a straight dowel. Roller shade 90 is pivotally attached to the back of panel 24a by means of a generally mushroom shaped retaining fixture 96, which is inserted through the eye formed by end 92 of roller shade 90. Retaining fixture 96 is fixedly attached to panel 24a by any suitable means, which may include, but is not limited to, bolting, riveting, screwing, or gluing. Retaining fixture 96 is preferably positioned close to the access opening 26 to avoid interfering with the head of the occupant when the occupant is standing within the module 10. In one preferred implementation this mounting is approximately 76 inches (approximately 193 cm) above floor panel 20.

When not in use, roller shade 90 will normally be stored vertically, with the dowel shaped end 94 being secured to the back of panel 24a by means of a hook-and-loop strap 98, or by some other suitable means. Alternatively, roller shade 90 can be stowed in a wall-mounted pocket (not shown) when not in use. In that case, a second support bracket, similar or identical to a hook shaped support bracket 100 that is attached to the back of panel 24b, will need to be used in place of retaining fixture 96. Furthermore, end 92 of roller shade 90 should be dowel shaped rather than being shaped in the form of an eyebolt.

To obtain complete privacy, a user deploys the roller shade 90 by first detaching the hook-and-loop fastener 98 in order to free end 94 of roller shade 90. The user then upwardly pivots the free end (end 94) of the roller shade 90 about retaining fixture 96 in such a manner as to enable the dowel shaped end 94 to engage the hook shaped support bracket 100. Bracket 100 is fixedly mounted to the back of a panel 24b at the same height and in the same manner as retaining fixture 96. Grasping a handle 102 and pulling in the direction away from the bi-fold door 24 and toward ladder assembly 42 will cause the roller shade 90 to deploy. Handle 102 contains a pair of hooks 104, one of which is positioned at either end of the handle 102. The user finishes deploying the roller shade 90 by engaging the hooks 104 with two eyebolts 106 (or other functionally equivalent devices) that are fixedly attached to the legs 42a of ladder assembly 42. Eyebolts 106 are attached to ladder assembly 42 at the same height that retaining fixture 96 and support bracket 100 are attached to panels 24a and 24b. The fully deployed roller shade 90 is shown in FIG. 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A multi-function access module for use within an aircraft to enable access to an overhead storage area, comprised of:

an enclosure having at least one wall, said wall having an outside surface and an inside surface;

a partition that is movable from a closed position to an open position, said partition being suitably attached to said at least one wall; and a ladder movably positioned within said enclosure between a stowed position, wherein said ladder takes up substantially no area within said enclosure, and an extended position, wherein said ladder may be used to easily access said overhead area;

wherein a floor portion is attached to said at least one wall for securing said ladder in said extended position.

2. The apparatus of claim 1, wherein said ladder is movable between a substantially upright position and an inclined position.

3. The apparatus of claim 1, further comprising at least one track-mount mechanism having a curved slot, said track-mount mechanism being suitably attached to the inside surface of said wall and operatively coupled to said ladder for assisting in defining a path of travel of said ladder when said ladder is moved between said extended and said retracted positions.

4. The apparatus of claim 3, wherein said ladder is attached for pivotal and sliding movement relative to said track-mount mechanism.

5. The apparatus of claim 3, further comprising a rod shaped dowel pin operably associated with said ladder and interposed through said curved slot of said track-mount mechanism, said dowel pin permitting pivotal movement thereabout of said ladder as said ladder is moved between said stowed and extended positions.

6. The apparatus of claim 1, further comprising a floor panel that is attached to said wall.

7. The apparatus of claim 1, further comprising a ceiling panel having an access opening sufficiently large enough to permit a person to climb there through.

8. The apparatus of claim 1, wherein said ladder has at least one leg, said leg having a bottom end to which a roller is mounted for facilitating sliding movement of said bottom end of said ladder.

9. The apparatus of claim 8 wherein said floor panel has at least one retaining pocket fixedly mounted to said floor panel for capturing and retaining said roller for holding said ladder in said extended position.

10. The apparatus of claim 1, wherein said partition comprises a bi-fold door.

11. The apparatus of claim 1, wherein said ladder is further comprised of a first half having a bottom end and a second half having a top end, said bottom end of said first half being rigidly attached to said top end of second half.

12. The apparatus of claim 1, further comprising at least one handrail suitably attached to the inside surface of said at least one wall.

13. A multi-function access module for enabling access to an overhead area within a fuselage of an aircraft, as well as providing a changing area for a crewmember, said access module comprising:
- a generally box shaped enclosure having a plurality of walls;
- a partition that is movable from a closed position to an open position, said partition being suitably attached to at least one of said walls to form a doorway allowing entry and egress from said box shaped enclosure;
- a track-mount mechanism that is fixedly attached to at least one of said walls; and
- a ladder situated within said enclosure that is movable between a stowed, substantially upright position, and an extended, inclined position, said ladder being coupled to said track-mount mechanism for pivoting and sliding movement relative to said track-mount mechanism, said ladder being held against one or more walls of said enclosure when in said stowed position such that substantially an entire interior area of said enclosure is unobstructed and may therefore be used as a changing room by a crew member;
- wherein said ladder is secured in said extended position by one of said plurality of walls.

14. The apparatus of claim 13, wherein said plurality of walls is comprised of:
- a generally rectangular shaped first wall;
- a generally rectangular shaped second wall that is attached to said first wall; and
- a generally rectangular shaped third wall that is attached to said second wall.

15. The apparatus of claim 14, further comprising a roller; and
- wherein said ladder comprises a leg having a bottom end, said roller being coupled to said bottom end to facilitate movement of said bottom end when said ladder is moved between said extended and stowed positions.

16. The apparatus of claim 15 wherein one of said plurality of walls is a floor panel that has at least one retaining pocket for capturing and retaining said roller when said ladder is moved into said extended position to secure the ladder in said extended position.

17. The apparatus of claim 13, further comprising a ceiling panel suitably attached to at least one of said first, second, or third wall panels, said ceiling panel having an access opening sufficiently large enough to permit a person to pass through to gain access to said overhead area.

* * * * *